United States Patent [19]

Rosário et al.

[11] Patent Number: 5,840,658

[45] Date of Patent: Nov. 24, 1998

[54] PROCESS FOR THE CONTROLLED FIXING OF SCALE INHIBITOR IN A SUBTERRANEAN FORMATION

[75] Inventors: Francisca Ferreira Do Rosário; Carlos Nagib Khalil; Maria Carmen Moreira Bezerra; Sandra Botelho Rondinini, all of Rio De Janeiro, Brazil

[73] Assignee: Petroleo Brasilerio S.A.- Petrobras, Rio De Janeiro, Brazil

[21] Appl. No.: 777,375

[22] Filed: Dec. 27, 1996

[51] Int. Cl.$^6$ .............................. E21B 43/22; C09K 7/02
[52] U.S. Cl. ...................... 507/236; 507/237; 507/238; 166/279; 166/305.1
[58] Field of Search ............................ 252/181; 507/236, 507/928, 237, 238; 166/305.1, 279

[56] References Cited

U.S. PATENT DOCUMENTS

| | | | |
|---|---|---|---|
| 3,633,672 | 1/1972 | Smith | 166/279 |
| 3,704,750 | 12/1972 | Miles et al. | 252/8.55 R |
| 4,532,052 | 7/1985 | Weaver et al. | 252/8.55 R |
| 4,602,683 | 7/1986 | Meyers | 166/279 |
| 4,947,934 | 8/1990 | Hen | 166/279 |
| 5,090,479 | 2/1992 | Read et al. | 166/279 |
| 5,141,655 | 8/1992 | Hen | 252/8.552 |
| 5,181,567 | 1/1993 | Shuler | 166/279 |
| 5,211,237 | 5/1993 | Faircloth et al. | 166/279 |
| 5,346,010 | 9/1994 | Adams et al. | 166/279 |
| 5,399,270 | 3/1995 | Hen | 507/224 |

FOREIGN PATENT DOCUMENTS 0459171  12/1991  European Pat. Off. .

*Primary Examiner*—Joseph K. McKane
*Assistant Examiner*—Deanna Baxam
*Attorney, Agent, or Firm*—Sughrue, Mion, Zinn, Macpeak & Seas, PLLC

[57] ABSTRACT

A process for fixing of a scale inhibitor in a subterranean formation, which comprises:

a) injecting into the formation a solution comprising a polymeric scale inhibitor, a metal cation, a precursor and a weak organic acid, wherein the polymeric scale inhibitor and metal cation are slightly soluble in water in the formation and wherein the precursor reacts in the formation to produce an alkaline compound which causes the polymeric scale inhibitor to precipitate in the formation; and b) allowing the polymeric scale inhibitor to precipitate in the formation in an amount which is effective in inhibiting scale formation for a given period of time.

18 Claims, 2 Drawing Sheets

PROCESS FOR THE CONTROLLED FIXING OF SCALE INHIBITOR IN A SUBTERRANEAN FORMATION

FIELD OF THE INVENTION

The present invention relates to a process for the controlled fixing of a scale (incrustation) inhibitor in a subterranean formation such as a well drilled in petroleum-producing sandstone. More specifically, the present invention relates to a process for prolonging the fixing of scale inhibitor in the pores of the petroleum-producing formation by the injection of a solution of acid aqueous fluid containing a polymeric scale inhibitor, a weak organic acid, a metal cation and a precursor which is capable of reacting in the formation to produce an alkaline compound which causes the precipitation of the polymeric inhibitor in the presence of the metal cation. When the treated well is placed in production, the inhibitor is gradually released by the pores, which effectively inhibits scale formation in the producing well and also in equipment used in drilling the well.

Precipitation of poorly soluble inorganic salts, such as calcium carbonate, calcium sulphate and barium and strontium sulphate, from fluids produced together with oil and gas is known in the art. Precipitation occurs because thermodynamic conditions which influence the solubility of these species, such as temperature and pressure, vary during production. This variation primarily occurs in the canyonings and in the production column of a drilling well. The precipitates formed adhere to equipment surfaces. The precipitate is known as scale or incrustation. Scale formation may occur both in the reservoir rock close to the producing well and in the production column, in the canyonings and in subsurface and surface equipment. Scale formation within equipment reduces the service life of the equipment and may block production columns.

In order to prevent or reduce scale formation, scale inhibitors may be fixed in a formation by a "squeeze" method. This involves injecting an inhibitor into the formation. The inhibitor is subsequently released with the flow of water when the well returns to production. The inhibitor present in the water produced prevents the formation of scale in the production column, canyonings, and surface and subsurface equipment. The injection process or "squeeze" of the inhibitor into the formation is a suitable way of introducing the scale inhibitor.

Most customary scale inhibitors are effective in concentrations of between 1 and 100 ppm relative to the water in the formation. One major problem is the control of the concentration of inhibitor which returns in brines which are produced. The inhibitors tend to be produced rapidly and the concentrations decrease rapidly to ineffective levels. This leads to frequent interruptions of production in the case of successive "squeeze" operations, as well as excessive expense in terms of the chemicals and equipment necessary for carrying out the operation.

BACKGROUND INFORMATION

Numerous attempts to monitor and delay the production of inhibitor are known in the art, for example U.S. Pat. Nos. 3,633,672 and 3,704,750 describe inhibitors which are slightly soluble in neutral or basic solutions and soluble in acid solutions. The inhibitors are introduced into the formation by the "squeeze" method in acid solution and are fixed by being in contact with the formation water and by reaction with the reservoir rock. The pH of the formation water is high, Which causes precipitation of the inhibitor. The inhibitor is produced gradually owing to partial solubility in the water produced. The problem with these processes is the slowness of inhibitor precipitation in the formation and the difficulty of estimating the efficiency of precipitation in the formation.

U.S. Pat. No. 4,602,683 describes inhibitors of the aminophosphonate type which precipitate in an acid pH and are dissolved in a pH above 6.0.

U.S. Pat. No. 4,947,934 describes a process for inhibiting the formation of scale in a well which comprises injecting into the well formation an acid aqueous solution, the pH of which is capable of forming a water-soluble complex of the inhibitor and a polyvalent cation. The aqueous solution preferably has a pH of 2 to 3 and contains a polyacrylate scale inhibitor having a molecular weight of 500 to 10,000 and a polyvalent cation. The equivalent ratio of polyvalent cation to polyacrylate scale inhibitor is equal to or less than 0.5 in the acid aqueous solution. In this process, it is believed that the natural conditions of the formation increase the pH of the solution in sufficient proportion to cause controlled precipitation and accentuated deposition of the scale inhibitor in situ in the form of a polyvalent-cation/polyacrylate complex. It is alleged that the solution of scale inhibitor used in this process avoids the premature plugging of the formation, substantially prolongs the duration of the treatment and completely inhibits scale formation.

U.S. Pat. No. 5,141,655 describes a process for inhibiting scale formation which comprises injecting into reservoir rock an aqueous solution of a strong acid having a first pH and containing, dissolved therein, a scale inhibitor, polyvalent metal ions and a heat-sensitive substance. The heat-sensitive substance decomposes at high temperatures to release an alkaline compound. As the aqueous acid solution is necessarily heated by the high temperature of the reservoir to a temperature at which alkaline compound is released by the heat-sensitive substance, the pH of the aqueous acid solution will necessarily increase. This causes a weakly soluble polyvalent metal salt of the inhibitor to precipitate on the porous surfaces of the reservoir rock. There is thus slow release of scale inhibitor into the water produced in the production phase.

U.S. Pat. No. 5,346,010 describes a process of precipitating scale inhibitor which comprises injecting the inhibitor into an acid solution containing a base-generating component and a chelating agent. The inhibitor is preferably a calcium salt of an organic phosphonate. The chelating agent prevents iron ions from causing premature hydrolysis of the base-generating component. It is alleged that the initial precipitation of the scale inhibitor is delayed sufficiently for the inhibitor to be injected into a subterranean formation.

The processes of the prior art have various drawbacks, from difficulty of precipitation of the inhibitor in the formation and reduced possibility of monitoring, as in U.S. Pat. Nos. 3,633,672 and 3,704,750, to drastic reduction of reservoir permeability, making the production of fluids difficult, as in U.S. Pat. No. 5,346,010.

Despite the techniques of the prior art, there remains the need for an injection or "squeeze" process for introducing into a formation a scale inhibitor which is in soluble form and then precipitating the inhibitor within the formation, the process having a high efficiency and being capable of being monitored.

The present invention provides a process for fixing a scale inhibitor in a formation using a polymeric scale inhibitor in soluble form which can be chemically monitored and which precipitates completely in the formation. Precipitation of the inhibitor is effected in situ and is sufficiently delayed and practically complete without, however, drastically reducing the permeability of reservoir rock of the formation. The process uses an inexpensive polymeric scale inhibitor, the effectiveness of which extends over three years or more.

SUMMARY OF THE INVENTION

Accordingly, the present invention provides a process for fixing of a scale inhibitor in a subterranean formation, which comprises:

a) injecting into the formation a solution comprising a polymeric scale inhibitor, a metal cation, a precursor and a weak organic acid, wherein the polymeric scale inhibitor and metal cation are slightly soluble in water in the formation and wherein the precursor reacts in the formation to produce an alkaline compound which causes the polymeric scale inhibitor to precipitate in the formation; and b) allowing the polymeric scale inhibitor to precipitate in the formation in an amount which is effective in inhibiting scale formation for a given period of time.

Upon injection of the solution into the formation, for example the wall of a drilling well, the precursor is hydrolyzed by the high temperature of the formation and, in the presence of the weak organic acid, produces an alkaline compound which increases the pH and buffers the solution, with subsequent complete precipitation of the polymeric scale inhibitor in the pores of the reservoir rock of the formation. Injection of inhibitor solution causes formation water to be produced. Formation water partially dissolves the scale inhibitor (present as the metal salt) by exchange with sodium ions from the formation water. As a result of this, a given concentration of inhibitor will remain in the water produced, preventing scale formation in the vicinity of the well, in the production column and in the subsurface equipment. The estimated life of the inhibitor within the formation is typically three years.

The treatment solution of the present invention is usually positioned at a given distance in the producing formation by the injection of a displacement fluid ("over-flush"). The displacement fluid is usually injected such that it spreads out over a minimum radial distance of 3 meters into the formation. The displacement fluid also ensures that the scale inhibitor is retained within a large area in the formation. The displacement fluid is typically brine and sea water or any saline solution which is compatible with the formation and with the treatment solution may be used. After injection of the displacement fluid injection must be interrupted and the formation (e.g well) closed for a sufficient period of time for hydrolysis of the precursor to take place and the pH to increase with consequent precipitation of the salt of the polymeric inhibitor.

PREFERRED EMBODIMENTS

Figure 1:
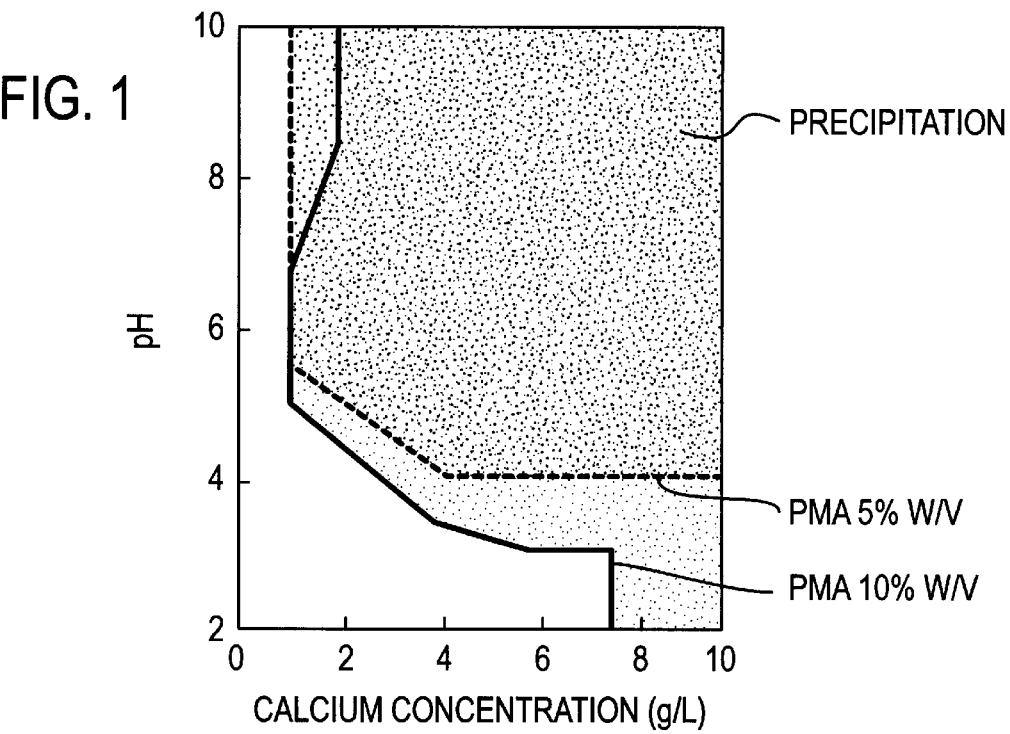
FIG. 1 illustrates the phase diagram of phosphine polymaleate (PMA) inhibitor acting for 30 minutes, at concentrations of 5% weight/volume and 10% weight/volume.

In one embodiment, the process of the invention initially involves the injection of a flush formed of brine containing a surfactant ("pre-flush"), followed by injection of the solution containing the polymeric scale inhibitor in a concentration of about 10% weight/volume. The "pre-flush" enhances the fixing of the precipitated inhibitor on the surface of the grains in the reservoir rock of the formation.

When the formation is the wall of a drilling well the well is closed, without injection or production of fluids, during precipitation in the formation of the polymeric scale inhibitor. Injection usually takes place in the direction of a canyoned space to be treated.

As a general rule, injection of the solution of polymeric inhibitor will spread out to at least two to three meters or more from the wall of the formation. The object is to inject an amount of inhibitor solution sufficient to result in an inhibitor concentration which is effective to avoid the formation of scale. Typically, after it has been fixed, the inhibitor produced will be present in formation water produced at a concentration of from 5 to 50 ppm, and preferably from 10 and 30 ppm. The exact amount of inhibitor solution used for a treatment depends on factors specific to each formation, for example the expected degree of supersaturation of the scale-forming minerals in the water produced, the rate of production of water, the temperature and pressure profile of the formation and the extent of protection desired relative to the radial distance reached by the inhibitor treatment. The concentration of polymeric inhibitor used in the solution usually varies from 1 to 20%, preferably 10%, by weight based on the volume ratio of water or brine in the solution.

The metal cation is typically bivalent, calcium being preferred.

In the process of the present invention, the adjustment of the initial pH of the solution is effected with weak acid, which also acts moreover as complexing agent both for the metal cation (e.g. calcium) and for other polyvalent ions, such as $Mg^{++}$, $Al^{+++}$, $Cr^{+++}$, $Fe^{+++}$ and $Cu^{++}$, which might be present as impurities during the preparation of the fluids. The weak acid complexing agent prevents the coprecipitation of these ions, which could alter the inhibitor/metal ion precipitation kinetics. The weak organic acid therefore makes it impossible for iron ions typically present in a production column, lines and equipment to cause the premature hydrolysis of the precursor and precipitation of the inhibitor before the latter is injected and correctly positioned in the formation.

Moreover, the use of weak acid is advantageous from the point of view of the neutralization of the weak base resulting from the decomposition of the precursor, the point of equivalence for the acid and the base of similar strength occurring at a neutral pH, without the jumps in pH which would occur if a strong acid and weak base were to be used, as in U.S. Pat. No. 5,141,655. In the present process, the increase in pH is gradual, and thus the acid pH is maintained during the decomposition of the precursor. This permits better control of the second step of the reaction, namely the precipitation of the scale inhibitor. Thus, the weak organic acid provides a buffer system in the solution.

The weak organic acid of preferred use in the present invention is acetic acid. This is commercially available and used routinely in petroleum-well stimulation operations. Acetic acid is effective in moderate concentrations of the order of 1 to 1.5 molar. Other organic acids which may be used include for example oxalic, propionic and butanoic acids.

The polymeric scale inhibitor is preferably a phosphine polycarboxylate, such as phosphine polymaleate (PMA).

The latter is commercially available as a product containing 2.8% by weight of phosphorus, and phosphine polycarboxylic acid in the form of its bivalent metal salt, also a commercial product, containing 0.74% by weight of phosphorus and of an average molecular weight of 3500. Generally at a pH of less than 4, the bivalent metals salts of these scale inhibitors are soluble. The structural formula of phosphine polycarboxlic acid is

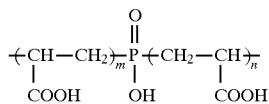

and the structural formula of phosphine polymaleate is

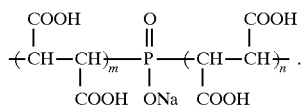

Precursors such as amides and ureas can be used when carrying out the process of the present invention. When urea or carbamide is used hydrolysis permits formation of a buffer system in accordance with the following reactions:

$NH_2CONH_2 + H_2O \longrightarrow CO_2 + 2NH_3$
$NH_2CONH_2 + H^+ + 2H_2O \longrightarrow HCO_3^- + 2NH_4^+$
$NH_2CONH_2 + 2H_2O \longrightarrow 2NH_4^+ + CO_3^-$ The rate of the hydrolysis of precursor at room temperature is very slow, yet the precursor must be added to the acid solution containing the scale inhibitor only at the time of injection into the formation. During the urea hydrolysis reaction, the weak acid-weak base neutralization reaction takes place at the same time. With the increase in the pH, there is also a reduction in the solubility of the metal complex of the scale inhibitor and it precipitates as a salt of the inhibitor:

$CH_3COO^- + NH_4^+ + H_2O \longrightarrow NH_4OH + CH_3OOH$

The rate of hydrolysis of the precursor has been studied at a temperature of 80° C. The weak acid/weak base neutralization reaction, for conditions of initial pH and temperature, define the reaction kinetics so that the final pH of about 7.0 is generally reached after a given time.

The concentration of the precursor in the solution will depend on the concentration of the acid used and accordingly on the initial pH of the solution, and furthermore on the final pH which it is desired to reach within a given time. The solution typically contains from 1 to 3, for example 2, moles of precursor. Normally, 1 to 1.5 moles of acid are necessary to reach an initial pH of between 3 and 4, the final pH of about 7 being reached by the use of about 2 moles of the precursor.

The inhibitor/metal cation ratio for an effective precipitation will depend directly on pH, as will be shown below in the present specification. The precipitation occurs at a pH above 4, given a weight ratio of inhibitor/cation of from 15 to 25, for example about 20.

The suitability of the proposed inhibitor- injection process was tested at a statistical level and in a dynamic test in porous medium. In both instances the suitability of the process of the invention was verified. From this it is possible to extrapolate the results to field tests with the same level of excellent results as obtained at the tested levels.

The present invention will now be illustrated by the following examples initially at a statistical level.

EXAMPLE 1

This example relates to the use of phosphine polymaleate (PMA) as scale inhibitor as illustrated in FIG. 1. The latter is a phase diagram for phosphine polymaleate (PMA) as scale inhibitor acting for 30 minutes at concentrations of 5% weight/volume and 10% weight/volume.

In order to obtain the data of the phase diagram which shows, for a given concentration of inhibitor used, the pH of precipitation for a given concentration of calcium ion, the kinetics of the hydrolysis of the precursor in acid solution and the neutralization reaction velocity were defined. On a laboratory scale, the inhibitor-containing fluid had the following composition:

2.0 moles/l of urea
0.06 moles/l of calcium chloride
50.0 g/l of PMA inhibitor
acetic acid for an initial pH of 3.7

Portions of 20 ml of the acid solution were transferred into Teflon cells of a capacity of 100 ml and placed in a waterbath at 80° C. for various periods of time (30 minutes to 24 hours), the calcium-chloride concentration being varied between I and 10 g/l. The occurrence of precipitation for the specific conditions of pH and calcium concentration was evaluated visually. As shown in FIG. 1, the lower concentration of inhibitor (5% by weight, or 50 g/l) is the most interesting from an economic standpoint since the inhibitor precipitates from a pH of about 5.5 and calcium concentrations of 1 g/l, while, for inhibitor concentrations of 10% by weight or 100 g/l, the initial precipitation pH is only slightly less, about 5.

On the basis of kinetic data, it is found that, with respect to the variation of the pH, the system behaves as a pseudo-first-order reaction, which leads to a suitable concentration of urea for precipitation of between 1 and 3 molar, preferably 2 molar. FIG. 1 therefore shows that the system proposed represents a fluid suitable for injection into wells to control scale formation of salts such as barium sulphate, strontium sulphate, etc., since the precipitated polymeric inhibitor will be released by dissolving with the formation waters produced, thus preventing precipitation, agglomeration and the growth of crystals of the salts.

EXAMPLE 2

Figure 2:
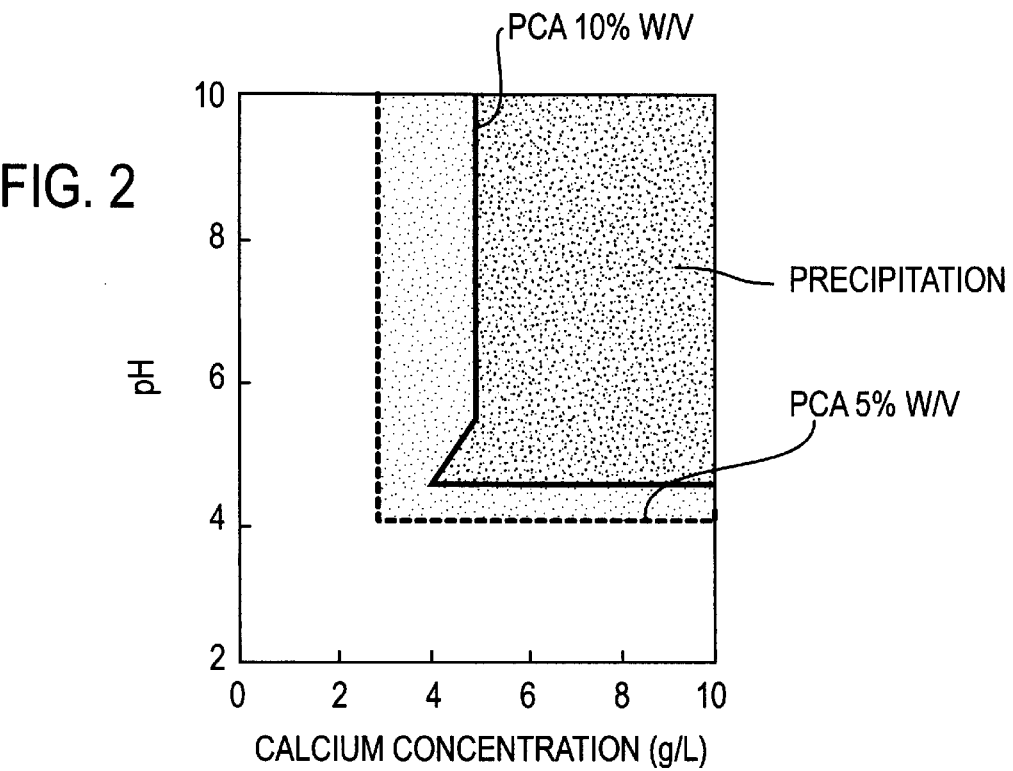
FIG. 2 illustrates the phase diagram of phosphine polycarboxylate (PCA) acting for 30 minutes at the concentration of 5% weight/volume for a temperature of 80° C.

Using the same procedure as in Example 1, the kinetic behaviour was established for the phosphine polycarboxylate (PCA) inhibitor in a concentration of 50 g/l, at a temperature of 80° C., for a period of 30 minutes. FIG. 2 illustrates the precipitation behaviour by means of a phase diagram. Qualitatively it was found that, for the same experimental conditions, the precipitation reaction for the phosphine polycarboxylate Inhibitor reaches equilibrium more slowly than in the case of the phosphine polymaleate inhibitor of Example 1.

EXAMPLE 3

This example illustrates a simulation of the "squeeze" treatment in porous medium. The scale inhibitor was fixed on a sample of Rio Bonito sandstone, the petrophysical and petrographic properties of which are similar to those of petroleum reservoir rock. After fixing, the inhibitor was gradually released from the sample of rock.

The simulation studies of the "squeeze" treatment were carried out by means of flow tests in porous medium, using the treatment fluids in accordance with the composition shown in Table 1 below.

TABLE 1

| SAMPLE RIO BONITO SANDSTONE | EXAMPLE 3A | EXAMPLE 3B |
| --- | --- | --- |
| Urea (g/l) | 120 | 120 |
| $Ca^{2+}$ (g/l) | 2.5 | 5 |
| Inhibitor % (w/v) | 50 | 100 |
| Acetic acid for | pH 3.7 | pH 3.7 |
| KCl (g/l) | 10 | 10 |

The samples of Rio Bonito Sandstone, with a permeability of 250 mD and dimensions of 3.8 cm in diameter and 13 cm in length, were saturated initially with brine to simulate the chemical composition of the water produced, in accordance with Table 2 below.

TABLE 2

| SYNTHETIC PRODUCED COMPONENTS | WATER CONCENTRATION (mg/l) |
| --- | --- |
| $Na^+$ | 22,381 |
| $Mg^+$ | 982 |
| $K^+$ | 390 |
| $Sr^+$ | 211 |
| $Ca^{++}$ | 1632 |
| $Ba^{++}$ | 115 |
| $Cl^-$ | 37,713 |
| pH | 8.0 |

Figure 3:
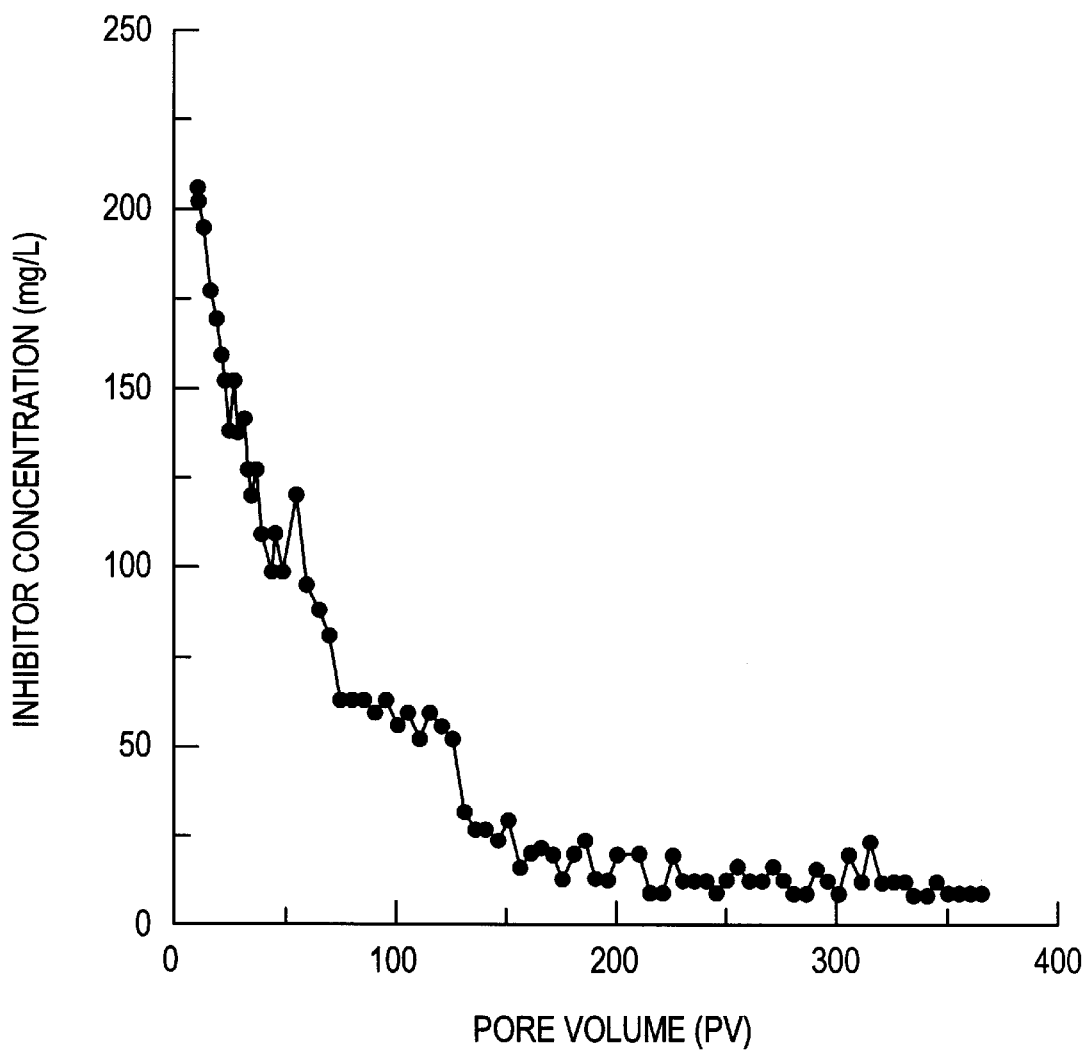
FIG. 3 illustrates the variation in Pore Volume (PV) for a curve of release of inibitor in the porous medium as a function of the flow of produced water.

Each sample was transferred to a "Hassler"-type cell, maintained at 80° C. The treatment fluid was injected at a rate of 0.5 ml/min. The sample was set aside in the "Hassler" cell for a period of 24 hours in order to ensure the precipitation and fixing of the Inhibitor in the pores of the rock. After this time, the brine (synthetic water produced) was injected into the samples, in the opposite direction from that of the injection of the treatment fluid. The permeability of the samples with respect to the synthetic water produced was then measured, a reduction in permeability as a function of the precipitation being noted. The continuous injection of the brine showed that there was a tendency for the samples to return to the original permeability values, owing to the dissolution of the inhibitor which had precipitated in the pores. During the tests, the efflux was collected and the concentration of inhibitor was determined by analysing the phosphorus using the plasma spectrometry (ICP-AES) technique. In accordance with the accompanying FIG. 3, a curve of inhibitor concentration against pore volume of injected brine was obtained. The profile of the release of the inhibitor from the porous medium illustrated in FIG. 3 shows the inhibitor dissolves, a constant rate of release of 15 mg/l of inhibitor being obtained at the end of the curve. Therefore, the test in porous medium, which very closely represents reservoir conditions, confirms that, in the "squeeze" by controlled precipitation with injection of a single treatment fluid, the maximum efficiency of precipitation and corresponding extension of the lifetime of the treatment can be achieved, with a constant rate of release as a function of the dissolution of the precipitated inhibitor mass.

We claim:

1. A process for fixing of a scale inhibitor in a subterranean formation, which comprises:

a) injecting into the formation a solution consisting essentially of a polymeric scale inhibitor, a metal cation, a precursor and a weak organic acid, wherein the polymeric scale inhibitor and metal cation are slightly soluble in water in the formation and wherein the precursor reacts in the formation to produce an alkaline compound which causes the polymeric scale inhibitor to precipitate in the formation; and b) allowing the polymeric scale inhibitor to precipitate in situ in the formation in an amount which is effective in inhibiting scale formation for a given period of time;

wherein the polymeric scale inhibitor is a phosphine polycarboxylate having the formula

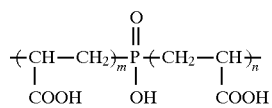

and the precursor is an amide or urea.

2. A process according to claim 1, wherein the subterranean formation is the wall of a drilling well and wherein the well is closed, without injection or production of fluids, during precipitation in the formation of the polymeric scale inhibitor.

3. A process according to claim 1, wherein the polymeric scale inhibitor is phosphine polymaleate having the formula

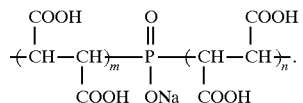

4. A process according to claim 1, wherein the polymeric scale inhibitor is present in the solution at a concentration of between 50 g/l and 100 g/l.

5. A process according to claim 1, wherein the solution contains from 1 to 3 moles of precursor per liter.

6. A process according to claim 5, wherein the solution contains 2 moles of precursor.

7. A process according to claim 1, wherein the precursor is urea.

8. A process according to claim 1, wherein injection of the solution into the formation is followed by injection of a displacement fluid into the formation.

9. A process according to claim 8, wherein the displacement fluid is brine.

10. A process according to claim 1, wherein the weak organic acid is acetic acid.

11. A process according to claim 1, wherein the metal cation is calcium.

12. A process according to claim 11, wherein the concentration of calcium in the solution is between 1 and 10 g/l.

13. A process according to claim 12, wherein the concentration of calcium in the solution is between 2.5 and 5 g/l.

14. A process according to claim 1, wherein between 5 and 50 ppm of polymeric scale inhibitor is precipitated in the formation water.

15. A process according to claim 14, wherein between 10 and 30 ppm of the polymeric scale inhibitor is precipitated in the formation water.

16. A process according to claim 1, wherein precipitation of the polymeric scale inhibitor take place at a pH above 4 and wherein the weight ratio of polymeric scale inhibitor to metal cation is between 15:1 and 25:1.

17. A process according to claim 16, wherein the weight ratio of scale inhibitor to metal cation is 20:1.

18. A process according to claim 1, wherein the solution consists of the polymeric scale inhibitor, the metal cation, the precursor and the weak organic acid.

* * * * *